US007266095B2

(12) United States Patent
Faineant et al.

(10) Patent No.: US 7,266,095 B2
(45) Date of Patent: Sep. 4, 2007

(54) ADDRESSING METHOD FOR USE IN AN ACCESS NETWORK OR A SATELLITE INFRASTRUCTURE NETWORK THAT CAN SUPPORT DATA TRANSFER IN NON-CONNECTED MODE

(75) Inventors: Virginie Faineant, Chaville (FR); Sébastien Josset, Toulouse (FR); Alain Feniou, Courbevoie (FR); Gabriel Bareux, Paris (FR)

(73) Assignee: Alcatel, Paris (FR)

( * ) Notice: Subject to any disclaimer, the term of this patent is extended or adjusted under 35 U.S.C. 154(b) by 632 days.

(21) Appl. No.: 09/988,290

(22) Filed: Nov. 19, 2001

(65) Prior Publication Data
US 2002/0089943 A1    Jul. 11, 2002

(30) Foreign Application Priority Data
Nov. 20, 2000 (FR) .................................. 00 14941

(51) Int. Cl.
*H04B 7/185* (2006.01)
(52) U.S. Cl. .................... 370/316; 370/315; 370/395.3
(58) Field of Classification Search ................ 370/310, 370/315–316, 395.3–395.32, 389, 395.54, 370/400, 410, 432
See application file for complete search history.

(56) References Cited

U.S. PATENT DOCUMENTS

| 5,652,795 | A  | * | 7/1997  | Dillon et al. | ............... 713/163 |
| 6,310,893 | B1 | * | 10/2001 | Yuan et al.   | ................. 370/474 |
| 6,570,859 | B1 | * | 5/2003  | Cable et al.  | ................. 370/323 |
| 6,771,609 | B1 | * | 8/2004  | Gudat et al.  | ................. 370/254 |
| 2002/0001310 | A1 | * | 1/2002 | Mai et al.   | ................... 370/390 |

FOREIGN PATENT DOCUMENTS

| WO | WO97/20413 | 6/1997 |
| WO | WO98/16046 | 4/1998 |
| WO | WO99/09707 | 2/1999 |

* cited by examiner

*Primary Examiner*—Huy D. Vu
*Assistant Examiner*—Jason Mattis
(74) *Attorney, Agent, or Firm*—Sughrue Mion, PLLC

(57) ABSTRACT

A method in accordance with the invention applies to an access network or a satellite infrastructure network supporting sub-networks grouping different terminal stations in which each packet is associated with an addressing header and in which each terminal station is associated with a satellite terminal or with a ground station that is located in the coverage of a particular spot of a particular satellite. The addressing header of each packet further contains a "label" field containing an identifier characteristic of a sub-network to which said terminal station and the spot in which the satellite terminal or the ground station with which it is associated is located belongs.

17 Claims, 7 Drawing Sheets

ADDRESSING METHOD FOR USE IN AN ACCESS NETWORK OR A SATELLITE INFRASTRUCTURE NETWORK THAT CAN SUPPORT DATA TRANSFER IN NON-CONNECTED MODE

The present invention relates to an addressing method for use in an access network or a satellite infrastructure network, a method of dynamically determining and optimizing an addressing label, a satellite telecommunications system implementing said methods, and the components of the system.

BACKGROUND OF THE INVENTION

For the past few years telecommunications systems have been evolving, apparently ineluctably, toward data transfer in compliance with the Internet Protocol (IP), in particular because the Internet Protocol offers the interactivity that is lacking in conventional broadcasting systems.

This trend affected terrestrial networks first, but is now extending to networks based on satellite infrastructures.

To meet this new requirement, satellite networks must therefore face up to new technical problems.

Solutions have already been proposed for transporting IP data packets in a satellite network but since those solutions are often the result of adapting systems initially dedicated to transporting point-to-point voice traffic or broadcast video traffic, they employ protocols that have not been optimized.

Traditionally, a satellite telecommunications system offers broadcast services, i.e. one-way data transmission, from a sender to a set of recipients and circuit mode call services, i.e. calls from one given point to another given point based on a virtual "circuit" or "cable" set up temporarily between the two points for calls between them.

In the world of the Internet, services providing calls between one user and another user registered with the same Internet service provider require two dedicated circuits to be set up, one from each user to the common Internet service provider, so that connection of the one user to the other user via the satellite system generates a double hop, i.e. double use of the satellite. This multiple hop phenomenon is accentuated if the two users are not registered with the same Internet service provider, as further hops are then necessary to interconnect the Internet service providers.

The same problem arises when sending data to a particular group of users, whether by means of a broadcast service, which is often referred to as a "multi-recipient" or "multi-cast" service (as opposed to a broadcast service aimed at all users of the system), or by means of a call in a virtual private sub-network that groups together certain users. For multi-recipient or virtual sub-network broadcasting, packets intended for a plurality of users are duplicated to as many recipients, and the data travels over as many dedicated traffic channels, or circuits, which unnecessarily increases the load on the network.

Another imperative that has to be considered is that it must be possible to integrate satellite networks offering facilities for transactions in accordance with the Internet Protocol transparently into terrestrial networks so that users can reach all Internet addresses on the world wide web, to send as well as to receive data, without concerning themselves about the path taken by the data packets to provide the transmission, and can thereby benefit from all Internet services already available on terrestrial networks.

OBJECTS AND SUMMARY OF THE INVENTION

An object of the present invention is to propose an addressing method for use in satellite telecommunications systems such that data can be sent either to a single recipient or to a group of recipients without requiring a connection to be set up.

Another object of the present invention is to facilitate the creation of multi-recipient groups or sub-networks in a satellite telecommunications system without duplicating packets as a function of the number of recipients to whom data is transmitted.

A further object of the present invention is to minimize the radio resources usually necessary for signaling data packets used to set up a connection between the sender and the receiver, by enabling the satellite system to operate in non-connected mode.

The invention further aims to render the integration of a satellite telecommunications system into a terrestrial telecommunications network transparent.

To this end, the invention first provides a method of sending data packets in an access network or satellite infrastructure network supporting sub-networks such as IP logical sub-networks, private networks, or multi-recipient groups, combining different terminal stations of the network, in which method each data packet is associated with an addressing header and each terminal station of the network is associated with a satellite terminal or a ground station located in the coverage of a particular spot of a particular satellite, wherein the addressing header of each data packet further contains a "label" field containing an identifier characteristic of a virtual sub-network to which said terminal station belongs and the spot in which the satellite terminal or the ground station with which said terminal station is associated is located.

One particular embodiment of the method is based on using a non-connected mode between the sending satellite terminal or ground station and the receiving satellite terminal or ground station.

In this case, data packets are sent with no connection between the sender and the receiver.

According to one particular feature of this method, the terminal stations of the network connected to the satellite terminals or to the ground stations consist of user terminals, routers, and data or service servers, in particular address resolution protocol servers.

Obviously, in the network which implements the method according to the invention, the user terminals, routers, and data or service servers communicate with the satellite or satellites of the telecommunications system via satellite terminals or ground stations.

However, in one particular embodiment, a terminal station and a satellite terminal or a terminal station and a ground station can constitute one and the same equipment unit, being combined in the same device. In particular, a user terminal and a satellite terminal can form a single portable device.

In a satellite telecommunications system, the solution proposed by the invention can use labels to address groups of users, exploiting one of the major advantages of satellites, namely their capacity to broadcast data to many users without mobilizing more energy or more resources than are required for only one user.

By means of the invention, data packets passing through a satellite are directed by the satellite or its control center directly into the spot containing the satellite terminal to which the intended recipient of the data packets is connected.

The invention also provides a method of dynamically determining and optimizing labels based on the address of a target terminal station which is the intended recipient of a data packet.

To determine the physical (or hardware) address of a target terminal station, the prior art Address Resolution Protocol (ARP) for resolving IP (Internet Protocol) addresses sends an "ARP request" data packet in broadcast mode, and therefore to all the terminal stations of the network, that packet containing the hardware address of the sender and the protocol address (IP address) of the target node. The request data packet passes through each terminal station but only the target terminal station recognizes its own protocol address and sends back to the sender a similar "ARP response" data packet in which it has entered its own hardware address in a field provided for this purpose.

The sender can therefore recover the hardware address of the target terminal station and thereafter send it data packets.

The invention starts from this prior art address resolution protocol to provide a method of dynamically determining labels with a view to implementing the data packet addressing method defined above in a satellite telecommunications system.

According to the invention, the method of determining and optimizing labels consists of installing a centralized label determination server (hereinafter referred to as a "label server") in each Internet service provider using the satellite network, communicating the label corresponding to said label server to each satellite terminal or to each ground station of the network at the time of registration with the Internet service provider of a user whose user terminal is connected to said satellite terminal or to said ground station, and having the satellite terminal or the ground station to which is connected the user terminal of a user requiring to send data to a target terminal station connected to another satellite terminal or another ground station send to the label server of its Internet service provider using the label corresponding to the label server a "Label request" data packet containing the IP address of the target terminal station, and having the label server send to the satellite terminal or to the sending ground station using the label corresponding to said sender a "Label response" data packet containing the label of the sub-network to which the target terminal station belongs.

According to one particular feature of the invention, the "Label response" data packet supplied by the label server is established as a function of the hardware location of the target terminal station.

It therefore determines whether the target terminal station:

is accessible via the satellite network and is registered with the same Internet service provider as the sender, or is accessible via the satellite network but is registered with an Internet service provider other than that of the sender, or is not accessible via the satellite network and requires use of a router of the same Internet service provider as the sender, or is not accessible via the satellite network and requires use of a router of an Internet service provider other than that of the sender.

The invention also proposes a method of optimizing the routing if it requires use of at least one intermediate router of the same satellite network.

In the method, when the label server is interrogated by submitting a "Label request" data packet corresponding to a target terminal station address, if the label server finds a label of a router in response to the request, said label server sends to said router a "Label optimization" data packet containing the address of the target terminal station as the destination address; any ground station of the satellite network that is used by its router to forward this "Label optimization" data packet to another router sends back to the label server an indication to the effect that the router label to be retained for that target terminal station is the label of the router to which that ground station forwards the "Label optimization" data packet.

Thus the label server can indicate the label of a router nearer the recipient. The optimization packet progresses from router to router and passes through successive ground stations and the label server is updated at each new intermediate router and finally indicates the label of the router in the satellite network nearest the recipient. Data packets sent with that label then reach the recipient in a single hop in the satellite network.

According to one particular feature of the above method the "Label optimization" data packet has a limited lifetime outside the satellite network in order for it to be eliminated spontaneously as soon as transmitting it from one ground station to another is no longer considered to be able to optimize the routing.

Thanks to the labels of the invention, a group of terminals and/or gateways can be addressed, not only in the context of a connection within a virtual sub-network, but also in the context of a multi-recipient broadcast.

According to another feature of the invention, the data packets are containers adapted to contain, among other things, IP packets, i.e. packets conforming to the standards for transfer of data in non-connected mode over Internet Protocol networks.

The method according to the invention is particularly efficient in the case of Internet Protocol transport because, in addition to the advantages already mentioned, it optimizes the satellite access protocol, as explained later.

According to the invention, each terminal station of the satellite network is seen as belonging to a virtual sub-network. That virtual sub-network can consist of said terminal station alone, as might be the case for a particular gateway, such as a ground station, a router, a label server or an address resolution server, or it can consist of a group of terminal stations, such as groups of user terminals combined in a virtual private network or in a multi-recipient group.

When determining the label of the header associated with a data packet, which, as previously indicated, characterizes a virtual sub-network to which the terminal station to which the packet is addressed belongs and a spot in which said terminal station is located, two situations can arise:

If the terminal station sending the data packet is connected to a satellite terminal or to a ground station registered in the satellite network and is itself registered with an Internet service provider, it has all the information required to determine the identifier constituting the label from the IP address (i.e. the address defined in accordance with the Internet Protocol) of the terminal station which is the intended recipient of the data packet.

On the other hand, if the satellite terminal of the sending terminal station is not registered in the satellite network, or if the satellite terminal or the ground station is registered in the network but the terminal station is not yet registered with the Internet service provider, it must first request authorization from an Internet service provider and to this end it must comply with a signaling procedure that includes the use for this purpose of a predefined label to send a data packet to the Internet service provider. In other words, in this case, the identifier constituting the label is predefined by the signaling procedure.

In accordance with the invention, the label added to the header of any data packet is used, on the one hand, by the satellite or satellites to transmit the data packets to the spots corresponding to said label and, on the other hand, by the satellite terminals and/or the ground stations to filter out the packets for which they are the intended recipients.

To summarize, the existence of the label in the header of the data packet means that the following two facts can be taken into account:

a satellite terminal or a ground station is located in the coverage of a given spot of a given satellite, and a terminal station, i.e. a user terminal, a router, or a data or service server connected to a satellite terminal belongs to a given virtual sub-network.

Furthermore, the label obeys the following rules:

A given virtual sub-network is allocated one or more labels.

However, a label is dedicated to only one given virtual sub-network.

The satellite knows the various spots associated with each label.

Each satellite terminal knows the labels that are authorized for it.

Each IP address (i.e. each address defined in accordance with the Internet Protocol) is associated with the label of its virtual sub-network.

To implement the method according to the invention, it is necessary to manage the various labels, label management combining the operations of allocating, revoking and updating labels in the various network address resolution protocol tables.

To this end, the invention provides a procedure for registering a user with an Internet service provider, during which procedure the Internet service provider supplies to the user's terminal:

a label for receiving data, used by other terminal stations of the network to send data packets to the user, a label for sending data to the Internet service provider, and a label for accessing the address resolution protocol server of the Internet service provider to recover labels corresponding to the IP addresses to which the user wishes to connect.

This registration procedure and the operations of sending and receiving data packets by the user terminal are described in more detail with reference to the example shown in the accompanying drawings.

The invention further provides a satellite terminal of a satellite telecommunications system using the method described above. Said terminal has a table for each Internet service provider with which are associated user terminals connected to satellite terminal, said table establishing the relationship between target user terminal addresses and the labels associated with them, and said terminal listens to receiving labels of sub-networks to which the user terminals associated with it belong.

In one particular embodiment of the invention the satellite terminal stores the sending label of the ground station with which it is associated, by means of which label it can send broadcast data packets to said ground station.

In another particular embodiment of the invention which is compatible with the previous embodiments a terminal station and the satellite terminal to which it is connected constitute one and the same equipment unit and are combined in the same device.

In one variant of this particular embodiment the terminal station is a user terminal which, with the satellite terminal, constitutes one and the same equipment unit.

The invention further provides an Internet service provider of a satellite telecommunications system implementing the method described above, the provider being associated with a label server adapted to supply an addressing label as a function of a target terminal station address of a data packet.

The invention further provides a satellite telecommunications system implementing the method described above, the system having access to a table establishing the relationship between labels allocated to sub-networks and the spots of its satellite system and means for sending a data packet associated with a given label only in the spot or spots linked to said label.

According to the invention the satellite contains said table or the table is contained in a network control center.

The invention further provides a ground station of a telecommunications system implementing the routing optimization method described above, the station including means for recognizing a "Label optimization" data packet coming from a label server and passing through said ground station to a target via a router connected to the ground station, and for sending the label server an indication to the effect that the label to be taken into account for said target is that to which said ground station forwards the "Label optimization" data packet.

The invention finally provides satellite telecommunications system for implementing the method described above, the system including at least one satellite terminal, at least one Internet service provider, and at least one satellite as described above.

One particular embodiment of the telecommunications system further includes at least one ground station as described above.

BRIEF DESCRIPTION OF THE DRAWINGS

To facilitate an understanding of the invention, embodiments of the invention are described below with the aid of the accompanying drawings, in which.

MORE DETAILED DESCRIPTION

Figure 1:
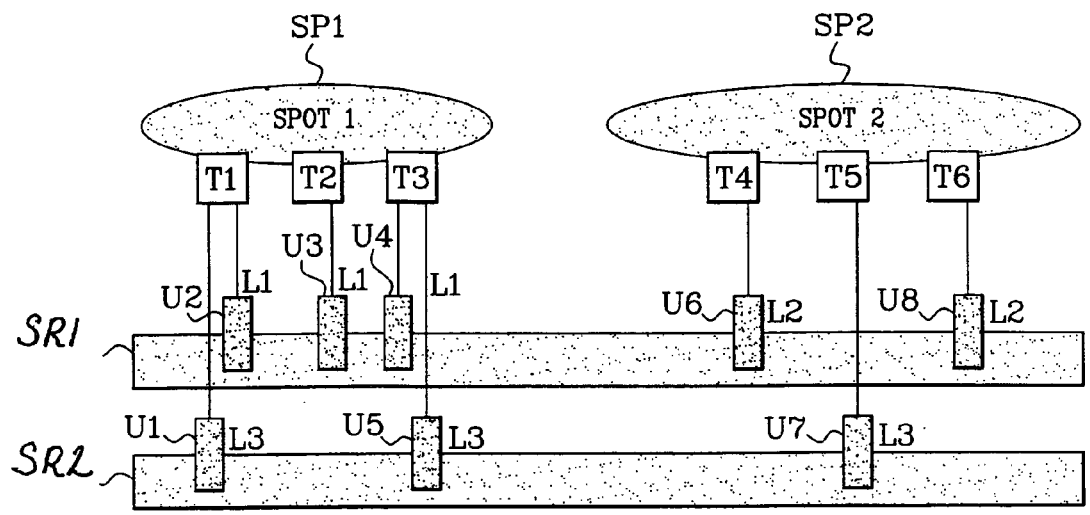
FIG. 1 is a diagrammatic representation of part of a satellite network.

The links set up between virtual sub-networks, satellite spots and user terminals by means of labels in accordance with the invention will now be described with reference to FIG. 1.

To simplify the explanation, in the example described the network is limited to a single satellite with two spots SP1 and SP2.

Eight users U1 to U8 are connected to the network. The users U2, U3, U4, U6 and U8 are grouped in a first virtual private sub-network SR 1 and the users U1, U5 and U7 are grouped in a second virtual private sub-network SR 2.

Satellite terminals T1 to T6 enable one or more user terminals to connect to the satellite network via one of its spots. Thus the satellite terminal T1 connects the user terminals U1 and U2 to the satellite via its first spot SP1.

Each satellite terminal has its own address resolution protocol (ARP) table, which is updated as data is sent and received by the satellite terminal. This is known in itself in the ARP art.

In the present case, the ARP table of each satellite terminal further contains a label field which is updated under the same conditions as the hardware address fields of the table.

In accordance with the invention, the table represented below associates labels L1, L2 and L3 with the virtual networks SR 1, SR 2 and the spots SP1, SP2.

| Virtual network | Label | Spot (s) |
| --- | --- | --- |
| SR 1 | L1 | SP1 |
| SR 1 | L2 | SP2 |
| SR 2 | L3 | SP1, SP2 |

In this way, if one user wishes to address data to another user, his connection terminal inserts the value corresponding to the other user in a label field of the addressing header of each data packet.

For example, the user U2 belongs to the virtual network SR 1 and is connected to the satellite network via the satellite terminal T1 located in the spot SP1. Consequently, packets for which the user U2 is the intended recipient contain the value L1 as their label.

A procedure for registering a user U1 with an Internet service provider ISP1 will now be described with reference to FIGS. 2 to 5.

When the satellite terminal T1 connected to the user terminal U1 is switched on, the satellite terminal must first identify itself to the satellite network. To this end, the satellite terminal T1 includes a memory containing labels enabling it to communicate with the ground station G1 which manages the satellite telecommunications system.

Those labels are:

a listening label Label_Broadcast_G1 that enables said satellite terminal to recover data broadcast in broadcast mode by the ground station G1, and a sending label Label_G1 that enables it to send data to the ground station G1.

The labels are allocated as a function of, among other things, the respective spots SP1 and SP2 in which the satellite terminal T1 and the ground station G1 are located.

The listening label Label_Broadcast_G1 is placed in the header of any broadcast data packet sent by the ground station. The label corresponds to all the virtual sub-networks and to all the spots of the satellite. It is included in the list of authorized labels of all the satellite terminals so that all users can receive data in broadcast mode from the ground station G1.

In a different embodiment, the sending label Label_G1 is not stored in the satellite terminal T1, but is instead broadcast in broadcast mode by the ground station G1 and recovered by the satellite terminal, when it is switched on, using the receiving label Label Broadcast NCC.

Figure 2:
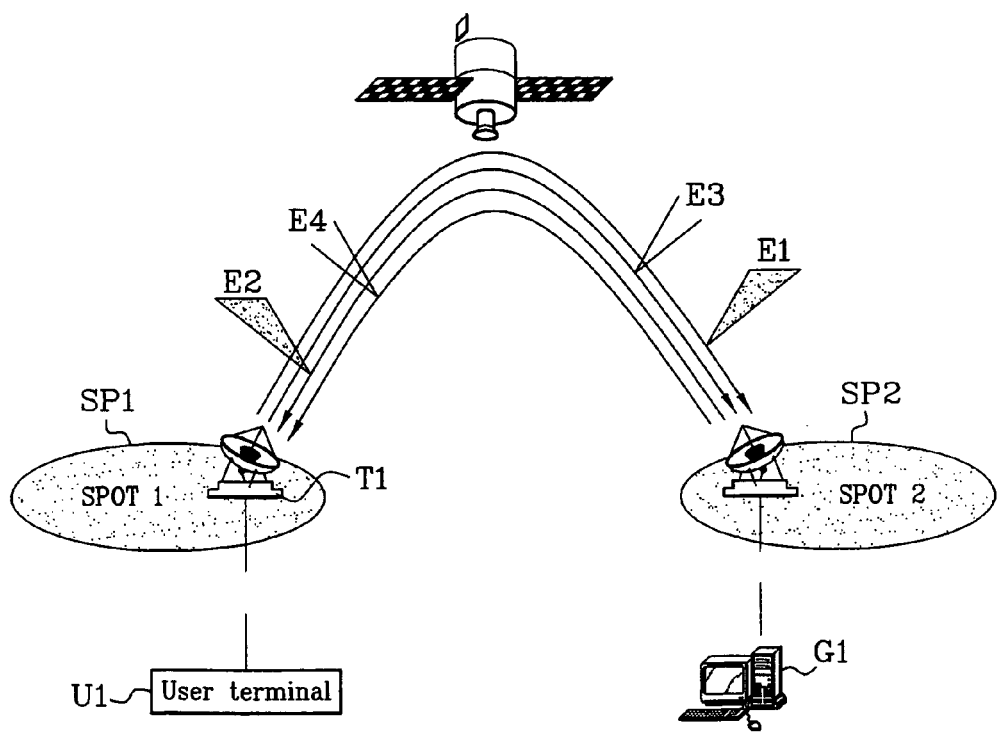
FIG. 2 is a perspective view of a satellite terminal, a satellite and a ground station.

To register it in the satellite network, the satellite terminal T1 sends a registration request to the ground station G1 using the label Label_G1 (step E1 in FIG. 2).

The ground station G1 responds to the satellite terminal in broadcast mode, using the label Label_Broadcast_G1 (step E2 in FIG. 2).

When the satellite terminal has been registered with the ground station, the user can register with his Internet service provider.

To this end, the user terminal U1 supplies the satellite terminal T1 with the number corresponding to the Internet service provider ISP1.

The satellite terminal T1 interrogates the ground station (step E3 in FIG. 2) and recovers the labels for communicating with the Internet service provider ISP1 located in the spot SP2(step E4 in FIG. 2), namely the label Label_listening_ISP1 for receiving data packets from the Internet service provider ISP1 and the label Label_sending_ISP1 for sending data to the Internet service provider.

The user can then register with the Internet service provider ISP1.

Figure 3:
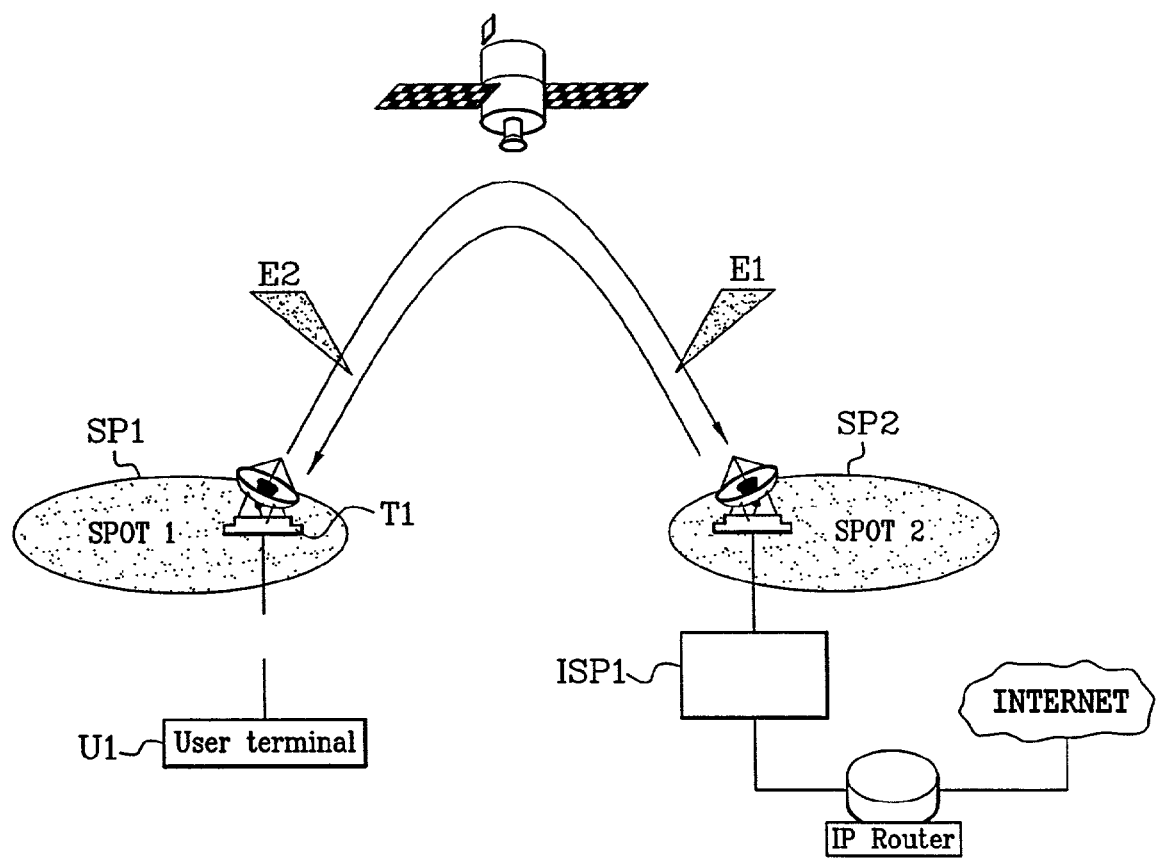
FIG. 3 is a perspective view of a satellite terminal, a satellite and an Internet service provider.

The registration request is sent to the Internet service provider with the label Label_sending_ISP1 (step E1 in FIG. 3).

The Internet service provider verifies the authorizations provided by the user's account with the access provider managing the Internet service provider ISP1 and, if the verification results are favorable (step E2 in FIG. 3), sends back a registration authorization accompanied by a label as yet unknown to the user terminal: the label Label_S-ARP that will enable the user to send requests directly to the centralized address resolution protocol server (not shown) associated with the Internet service provider ISP1.

Also, the Internet service provider can supply listening labels (Label_listening_ISP1) and sending labels (Label_sending_ISP1) dynamically to the Internet service provider and to the satellite networks; the listening labels are optimized as a function of their location.

The user is then registered with the network and has access to means for sending and receiving data packets using labels in accordance with the invention.

Figure 4:
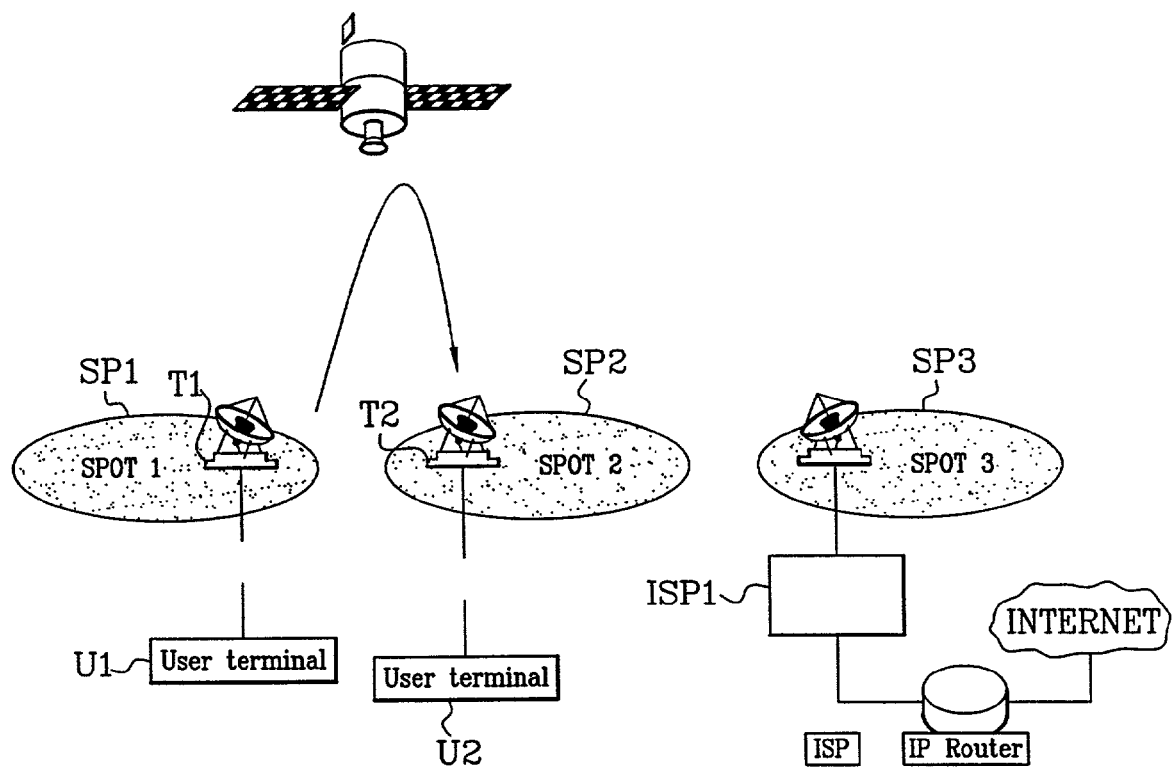
FIG. 4 is a perspective view of two satellite terminals connected to user terminals, a satellite and an Internet service provider.

Data packets are sent and received in the manner described next with reference to FIG. 4.

When data is sent from the user terminal U1 to the user terminal U2, the satellite terminal T1 receives data packets from the user terminal U1, each with a header containing the protocol address of the user terminal U2.

If the table S-ARP of the satellite terminal T1 already contains the protocol address of the user terminal U2, the satellite terminal adds the label field Label_n corresponding to the user terminal U2 (i.e. Reflecting the fact that the terminal U2 belongs to a virtual sub-network and is connected to a satellite terminal T2 located in the spot SP2), and sends the data packet to the satellite.

In the satellite, the data packets are recognized as having the label Label_n and are sent directly to the spot SP2.

If the table S-ARP of the satellite terminal T1 does not contain the protocol address of the user terminal U2, the method of dynamically determining the label of a recipient U2 of data sent by a sender U1 must be used.

Figure 5:
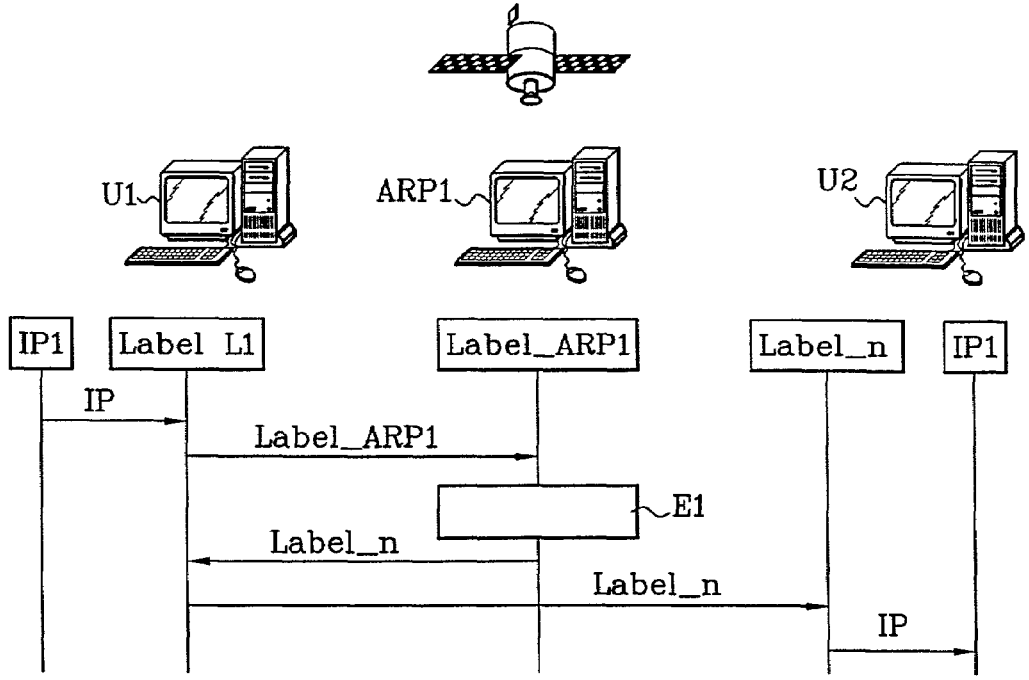
FIG. 5 is a block diagram showing the exchange of data packets between a user terminal sending data, a label server, an Internet service provider, and a user terminal which is the intended recipient of the data.

That method will be described with reference to FIG. 5, which represents the first user terminal U1, the label server S-ARP1 associated with the Internet service provider ISP1, and the second user terminal U2.

In accordance with the invention, the satellite terminal T1 connected to the user terminal U1 submits an address resolution request, but not in broadcast mode, which would cause network traffic congestion; the request is instead submitted to the centralized address resolution protocol server S-ARP1, using the label Label_S-ARP1.

In step E1, the centralized address resolution protocol server S-ARP1 dynamically determines the label Label_n corresponding to the user terminal U2 and sends the label back to the satellite terminal T1. The data packet is processed and sent by the satellite terminal T1 in the manner previously described.

For reception of data by the user terminal U1, the satellite terminal T1 has a list of authorized labels used as a reception filter. Only data packets whose header contains a label in the list are processed by the satellite terminal.

The processing consists of extracting the address of the destination user terminal and sending the data packets to it.

The list of authorized labels is updated every time a new label is authorized for user terminals connected to the satellite terminal, i.e. on the following occasions:

when the satellite terminal registers with the network, when a user terminal connected to the satellite terminal registers with an Internet service provider, when connecting a user to a server, and when a user joins a multi-recipient group or a virtual private network.

The method of determining labels dynamically as a function of the physical location of the intended recipient will now be described in detail with reference to FIGS. 6 to 9.

Figure 6:
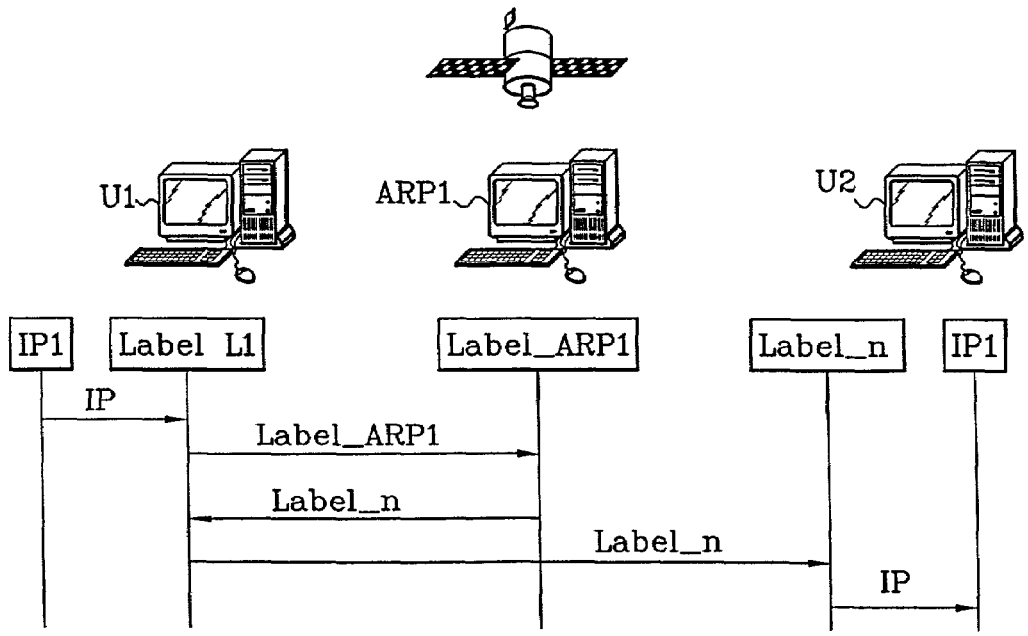
FIG. 6 is a diagram analogous to that of FIG. 5 and in which the user terminal which is the intended recipient of the data shares the same Internet service provider as the sender.

In FIG. 6, the intended recipient U2 is accessible directly via the satellite network. The centralized address resolution protocol server S-ARP1 (also referred to as a label server) knows the protocol address of the user terminal U2 and responds to the label request sent by the terminal U1 by indicating the label Label_n corresponding to the terminal U2.

The terminal U1 can therefore send to the terminal U2 using the label Label_n.

Figure 7:
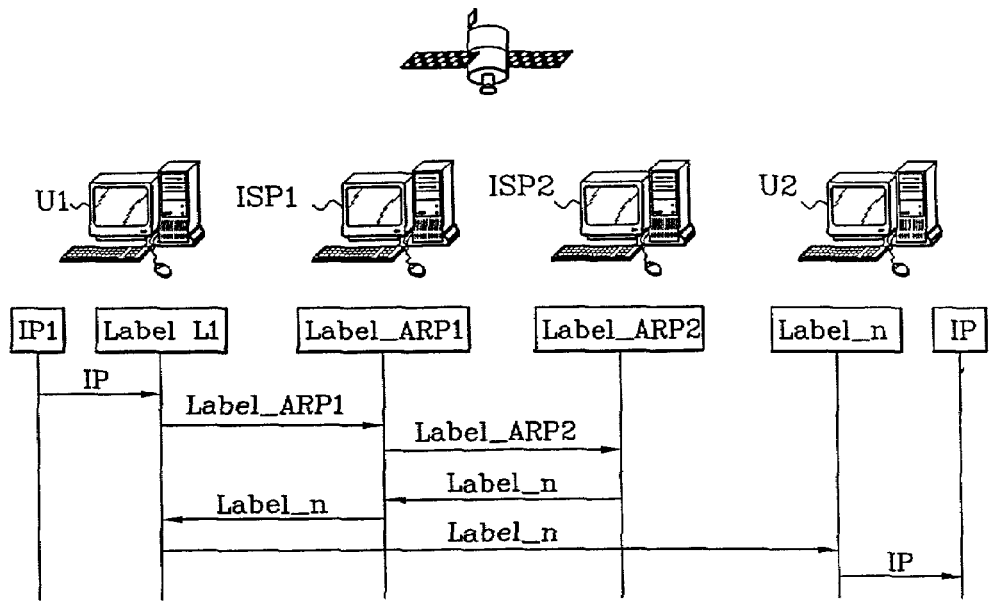
FIG. 7 is a block diagram showing the exchange of data packets between a user terminal sending data, a first label server of a first Internet service provider, a second label server of a second Internet service provider, and a user terminal which is the intended recipient of the data.

In FIG. 7, the destination terminal U2 is accessible via the satellite network but is registered with an Internet service provider ISP2 other than the Internet service provider ISP1 of the sending terminal U1.

The label request sent by the terminal U1 to the label server S-ARP1 initiates interrogation by the latter of the label server S-ARP2 associated with the Internet service provider ISP2.

The interrogation complies with a predefined protocol for communication between the label servers S-ARP1 and S-ARP2. In particular, a static or dynamic addressing plan is established so that the label server S-ARP1 can tell that the Internet service provider ISP2 uses the address of the terminal U2. A dynamic addressing plan can be obtained by systematically interrogating all the Internet service providers that have entered into an agreement with the Internet service provider ISP1 or by dynamically exchanging information between the Internet service providers.

The label server S-ARP2 sends back to the label server S-ARP1 the label Label_n corresponding to the terminal U2.

In turn, the label server S-ARP1 sends back to the satellite terminal of the terminal U1 the label Label_n and the satellite terminal sends the data packet or packets using the label obtained in this way.

Figure 8:
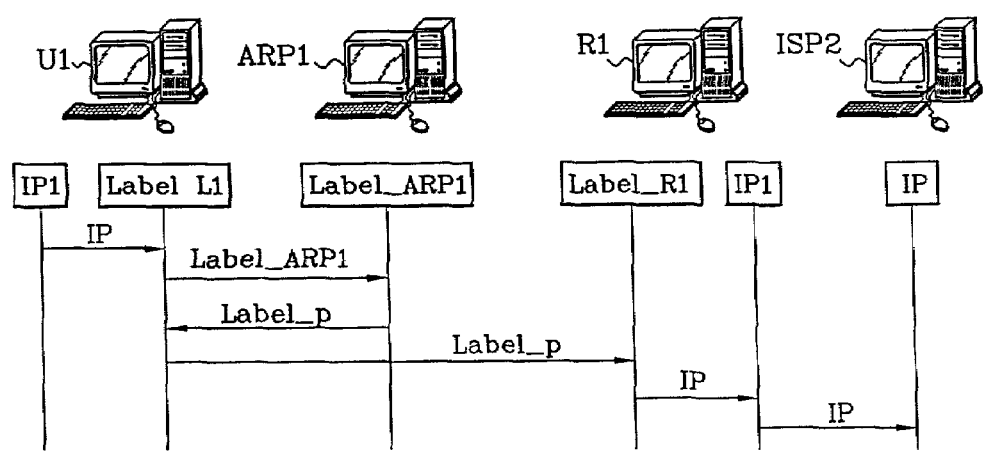
FIG. 8 is a block diagram showing the exchange of data packets between a user terminal sending data, a label server of a first Internet service provider, a router and an Internet service provider connected to the intended recipient of the data.

In FIG. 8, the destination terminal U2 is not directly accessible via the satellite network and addressing the intended recipient entails passing through a router R1 to an Internet service provider ISP2 with which the destination terminal U2 is registered.

The label server S-ARP1 responds to the same initial request as previously by supplying the label Label_p corresponding to the router R1 associated with the Internet service provider ISP1.

The sender then sends the data to the terminal U2 using the label Label_p.

The data packets reach the router R1, which forwards them to the recipient U2.

Figure 9:
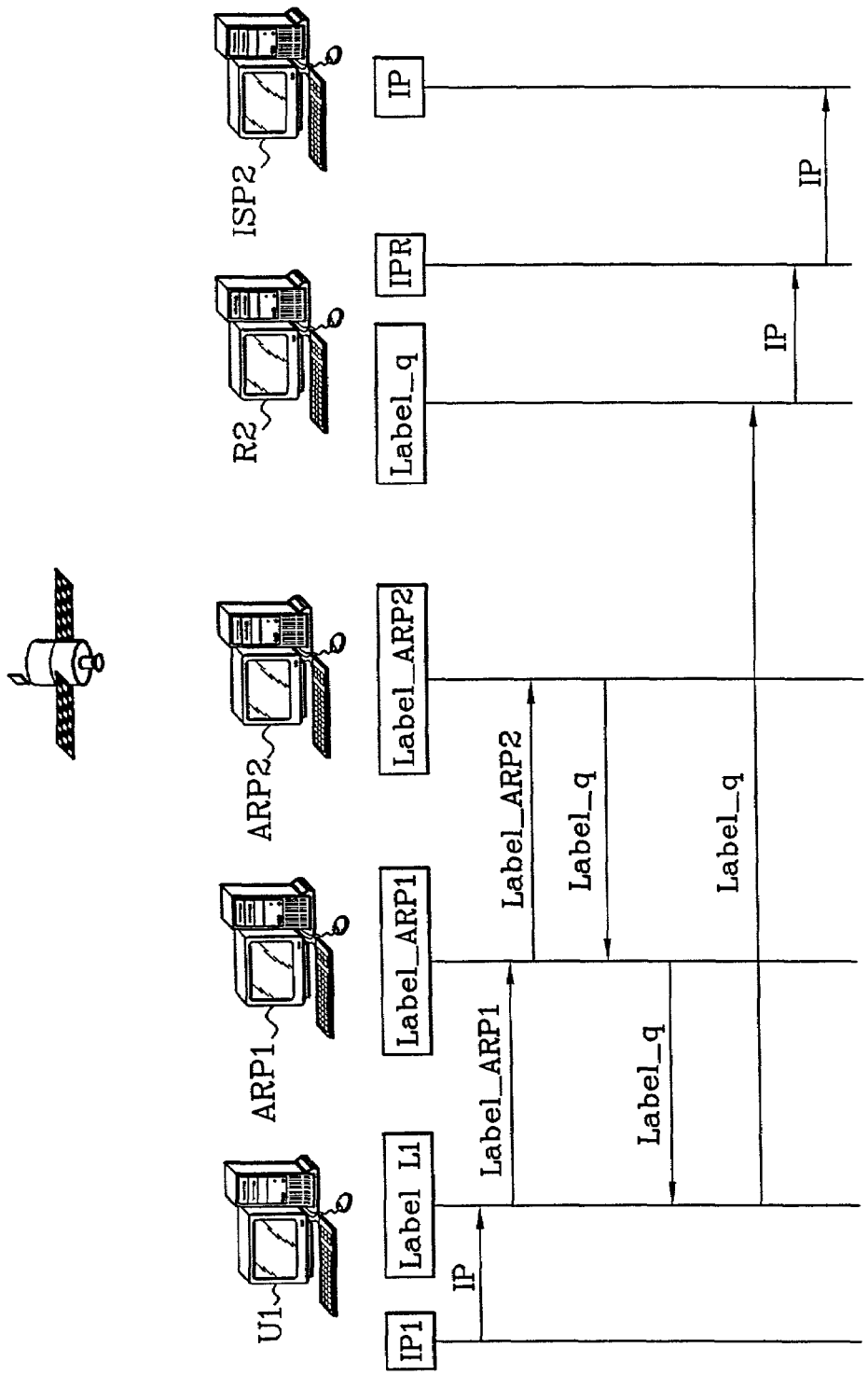
FIG. 9 is a block diagram showing the exchange of data packets between a user terminal sending data, a first label server of a first Internet service provider, a second label server of a second Internet service provider, a router and an Internet service provider connected to the intended recipient of the data.

In FIG. 9, the intended recipient U2 is not accessible via the satellite network; addressing the intended recipient entails passing through a router R2 associated with an Internet service provider ISP2 other than that of the sender, and with which U2 is registered.

The label request addressed to the server S-ARP1 causes the latter to perform a routing operation to determine the address of the router R2 to which to forward the data packet.

The server S-ARP1 sends a label request to the label server S-ARP2 of the Internet service provider ISP2.

The server S-ARP2 sends back to the server S-ARP1 the label Label_q corresponding to the router R2 of the Internet service provider ISP2 with which the user terminal U2 is registered. The server S-ARP1 in turn responds to the request from the satellite terminal connected to the user terminal U1 by supplying the label Label_q.

The user terminal U1 can therefore send data to the router R2 using the label Label_q.

Figure 10:
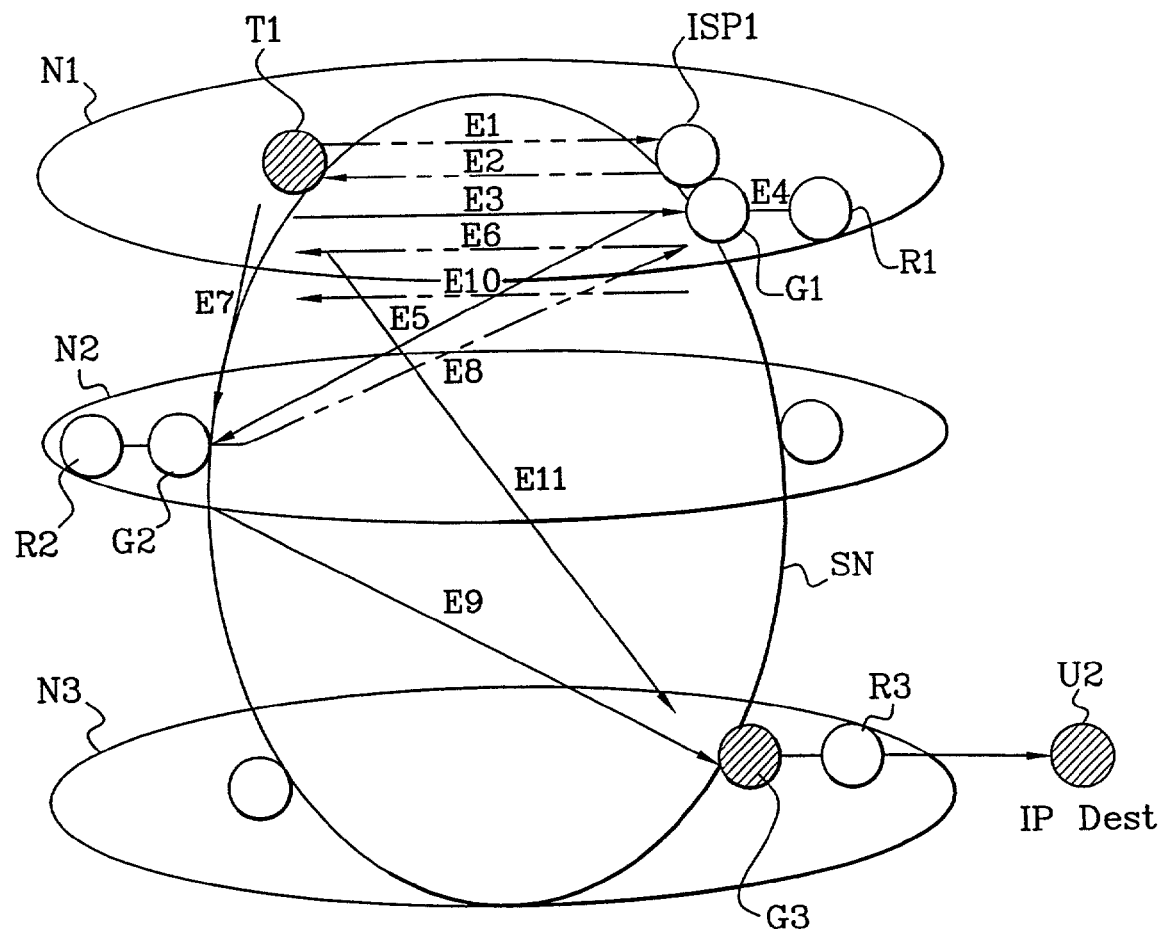
FIG. 10 is a diagram of a satellite network which covers a plurality of Internet service providers and is integrated into the terrestrial network.

Referring to FIG. 10, a routing optimization method is described next in a situation where the intended recipient does not belong to the satellite network.

The object of this optimization is to reach the last router preceding the routing output from the satellite network in a single hop within the satellite network.

FIG. 10 shows:

a satellite terminal T1 sending data (on behalf of a user terminal, not shown) and belonging to a first network N1 based on a ground station G1, an Internet service provider ISP1 and its label server S-ARP1 (not shown), and a router R1, a second network N2 based on a ground station G2 and an associated router R2, a third network N3 based on a ground station G3 and an associated router R3, and a terminal U2 which is the intended recipient of the data sent by the terminal U1.

The three networks N1, N2, N3 are different in the sense that they have different ground stations and different Internet service providers. However, they are based on the same satellite infrastructure network SN.

They are networks whose Internet service providers have entered into agreements with each other at the routing level in accordance with the Internet protocol, but have not wished to optimize conjointly their satellite addressing, with a view to an addressing plan, and have decided to accept the risk of packets executing double or even triple satellite hops on passing from one router to another.

To find out which label to use for addressing the terminal U2, the terminal U1 sends a label request to the label server S-ARP1 associated with its Internet service provider (step E1).

Because the address of the terminal U2 is not an address in the satellite network, the label server S-ARP1 assigns the router R1 as the recipient and returns to the terminal U1 the label Label_R1 corresponding to the router R1 (step E2).

The terminal U1 then starts to send data packets to the terminal U2 using the label Label_R1 (step E3).

With the aim of optimizing routing, the label server S-ARP1 sends the router R1 a "Label optimization" data packet whose intended recipient is the terminal U2 (step E4).

The router R1 determines that the optimization packet whose intended recipient is the terminal U2 must be transmitted to the second network N2. To this end, the router R1 sends the optimization packet to the ground station G1 for onward transmission to the ground station G2.

The ground station G1 detects the optimization packet that it must transmit to G2 (step E5) and reacts by alerting the label server S-ARP1 that, to send data to the terminal U2, it must use the label Label_G2 of the ground station G2.

Thus alerted, the label server S-ARP1 sends the terminal U1 information for updating its address resolution protocol table S-ARP including the label field (step E6).

The terminal T1 therefore begins to send data packets using the label Label_G2 and the data therefore travels in a single hop from the terminal T1 to the ground station G2, bypassing the router R1 (step E7).

Once it has received the optimization packet, the ground station G2 determines that the address of the terminal U2 is not accessible via the second network and forwards the packet to its router R2.

The latter determines that it must address the packet to the third network N3, and therefore returns the optimization packet to the ground station G2 for transmission to the third network.

The ground station G2 detects the optimization packet and advises the label server S-ARP1 that, for addressing the terminal U2, it is preferable to use the label Label_G3 corresponding to the ground station G3 of the third network (step E8). The optimization packet it transmitted to the station G3 (step E9).

The label server S-ARP1 sends the terminal T1 information for updating its table S-ARP (step E10) and the terminal begins to send data packets to the terminal U2 using the label Label_G3 (step E11).

The data therefore reaches the ground station G3 from the terminal T1 in a single hop.

The router R3 sends the optimization packet to the terrestrial network, where it is destroyed simply because the protocol stacks ignore it.

To ensure that the optimization packet self-destructs, it preferably has a limited lifetime outside the satellite network, preventing it from being sent to two successive terrestrial routers. In concrete terms, its self-destruction is achieved by counting down a re-routing counter that is reset to the value 2 on each transit through a ground station and which prevents the packet from being sent if the counter is at 0.

It can be seen that the invention enables optimum use of satellite networks, whilst being capable of adapting to circuit mode calls and exploiting the facilities offered by satellite networks for multi-recipient broadcasting or broadcasting in virtual private networks.

The protocols and the configuration of the satellite terminals are simplified. In the ground stations, the functions tied specifically to the satellite system are separated from those which are the same as in a terrestrial network. Label management is much simpler in the satellites than in the terminals, which are much more numerous than the labels. Moreover, the table of labels in a satellite is updated only at the time of allocation and revocation of labels by the ground station. Thus in particular it is of no benefit to provide for updating this table at the time a user is connected.

For clarity, the invention has mainly been described with reference to data transport in accordance with the Internet Protocol, but the person skilled in the art will readily understand that the invention applies to transporting data packets of all types.

The invention claimed is:

1. A method of sending data packets in an access network or satellite infrastructure network supporting virtual sub-networks, combining different terminal stations of the network and being allocated one or more labels, in which method a data packet is associated with an addressing header and each terminal station of the network is associated with a satellite terminal or a ground station located in the coverage of a particular spot of a particular satellite, said method comprising sending said data packets in the access network or satellite infrastructure network, wherein the addressing header of the data packet further contains a "label" field containing a label allocated to one virtual sub-network to which a target terminal station, to which the packet is addressed, belongs and characteristic of at least one spot associated with the label, said at least one spot including the spot in which the satellite terminal or the ground station, with which said target terminal station is associated, is located, wherein at least one satellite uses the label contained in the header of the data packet to transmit the data packet to the at least one spot associated with said label, and wherein a satellite terminal or ground station located in said at least one spot has a list of authorized labels used as a reception filter, so that the satellite terminal or ground station processes the data packet only if the label contained in the header of the data packet is in the list of authorized labels of said satellite terminal or ground station.

2. A method according to claim 1, wherein data packets are sent with no connection between the sending satellite terminal or the sending ground station and the receiving satellite terminal or the receiving ground station.

3. A method according to claim 1, wherein the terminal stations of the network connected to the satellite terminals or to the ground stations consist of user terminals, routers, and data or service servers, in particular address resolution protocol servers.

4. A method according to claim 1, wherein the data packets are containers adapted to contain, among other things, IP packets, i.e. packets conforming to the standards for transfer of data in non-connected mode over Internet Protocol networks.

5. A method according to claim 1, wherein said particular satellite has plural spot beams.

6. A method according to claim 1, wherein the label in each header is selected from a set of plural labels each representing a different combination of subnetwork and at least one satellite spot.

7. A method according to claim 1, wherein the headers of at least some data packets destined for terminals in the same subnetwork but in different satellite spots will contain different labels.

8. The method according to claim 1, wherein each sub-network has a different Internet service provider.

9. The method according to claim 1, wherein the processing of the data packet by the satellite terminal or ground station comprises extracting the address of the target terminal station and sending the data packet to the target terminal station.

10. The method according to claim 1, wherein each sub-network is a virtual sub-network.

11. A satellite telecommunications system implementing the method according to claim 1, the system including:
    at least one satellite terminal having a table for each Internet service provider with which are associated user terminals connected to satellite terminals, said table establishing the relationship between target user terminal addresses and the labels associated with them, and the satellite terminal listening to receiving labels of sub-networks to which the user terminals associated with it belong,
    at least one Internet service provider associated with a label server adapted to supply an addressing label as a function of a target terminal station address of a data packet, and
    at least one satellite having access to a table establishing the relationship between labels allocated to sub-networks and the spots of its satellite system, and means for sending a data packet associated with a given label only in the spot or spots linked to said label,
    wherein the satellite terminal has the list of authorized labels used as the reception filter, so that the satellite terminal processes the data packet only if the label contained in the header of the data packet is in the list of authorized labels of said satellite terminal.

12. The satellite telecommunications system according to claim 11, wherein the satellite terminal stores the sending label of the ground station with which it is associated, by means of which label it can send broadcast data packets to said ground station.

13. A satellite telecommunications system according to claim 11, wherein a terminal station and said satellite terminal constitute one and the same equipment unit and are combined in the same device.

14. A satellite telecommunications system according to claim 11, wherein the terminal station is a user terminal which, with said satellite terminal, constitutes one and the same equipment unit.

15. A satellite telecommunications system according to claim 11, wherein the satellite contains said table establishing the relationship between labels allocated to sub-networks and the spots of its satellite system.

16. A satellite telecommunications system according to claim 11, wherein the table establishing the relationship between labels allocated to sub-networks and the spots of its satellite system is contained in a network control center.

17. A method of sending data in a satellite network supporting virtual sub-networks combining different terminal stations of the network, the method comprising the steps of:
    installing a centralized label determination server in an Internet service provider, which uses the satellite network,
    communicating a label (Label_SARPI) corresponding to said label determination server to a satellite terminal or a ground station of the network, said label being characteristic of a spot in which the label determination server is located,
    providing to said satellite terminal or to said ground station data to be sent to a target terminal station having an IP address,
    having the satellite terminal or the ground station send to the label determination server of its Internet service provider, using the label (Label_SARPI) corresponding to the label determination server, a "Label request" data packet containing the IP address of the target terminal station,
    having the label determination server determine a label characteristic of one virtual sub-network to which the target terminal station belongs and characteristic of at least one spot associated with the label, said at least one spot including the spot in which a satellite terminal or the ground station with which said target terminal station is associated is located,
    having the label determination server send to the satellite terminal or to the sending ground station, using a label characteristic of at least one spot in which said sender is located, a "Label response" data packet containing the label (Label_n) determined by the label determination server, and
    sending in the satellite network at least one data packet comprising the data to be sent and associated with an addressing header, which includes said label determined by the label determination server,
    wherein at least one satellite uses the label contained in the header of the data packet to transmit the data packet to the at least one spot associated with said label, and
    wherein a satellite terminal or ground station located in said at least one spot has a list of authorized labels used as a reception filter, so that the satellite terminal or ground station processes the data packet only if the label contained in the header of the data packet is in the list of authorized labels of said satellite terminal or ground station.

* * * * *